United States Patent [19]

Sweet et al.

[11] Patent Number: 5,015,536
[45] Date of Patent: May 14, 1991

[54] METHOD OF MOUNTING PERMANENT MAGNETS WITHOUT ORGANIC ADHESIVES

[75] Inventors: Richard C. Sweet, N. Tarrytown; Jose M. I. Azevedo, Mahopac; Robert L. Bronnes, Irvington, all of N.Y.

[73] Assignee: North American Philips Corporation, New York, N.Y.

[21] Appl. No.: 380,231

[22] Filed: Jul. 14, 1989

[51] Int. Cl.$^5$ ............................................. H01F 10/30
[52] U.S. Cl. ................................... 428/611; 428/632; 428/660; 428/662
[58] Field of Search ............... 428/611, 632, 633, 660, 428/662, 672–676

[56] References Cited

U.S. PATENT DOCUMENTS

| | | | |
|---|---|---|---|
| 3,793,705 | 2/1974 | Cole et al. | 228/208 |
| 3,960,512 | 6/1976 | Vaguine et al. | 428/632 |
| 3,969,086 | 7/1976 | Vaguine et al. | 428/632 |
| 4,559,280 | 12/1985 | Bronnes et al. | 428/633 |
| 4,643,347 | 2/1987 | Bronnes et al. | 228/208 |

Primary Examiner—Theodore Morris
Assistant Examiner—George Wyszomierski
Attorney, Agent, or Firm—Norman N. Spain

[57] ABSTRACT

A metal shaft is joined to a permanent magnet by a seal formed of a thin layer of a metal on the magnet which forms a bond with the magnet. A layer of a solorable metal provided on the thin layer and a layer of a low melting point solder contacting the metal shaft and layer of solderable metal.

10 Claims, 1 Drawing Sheet

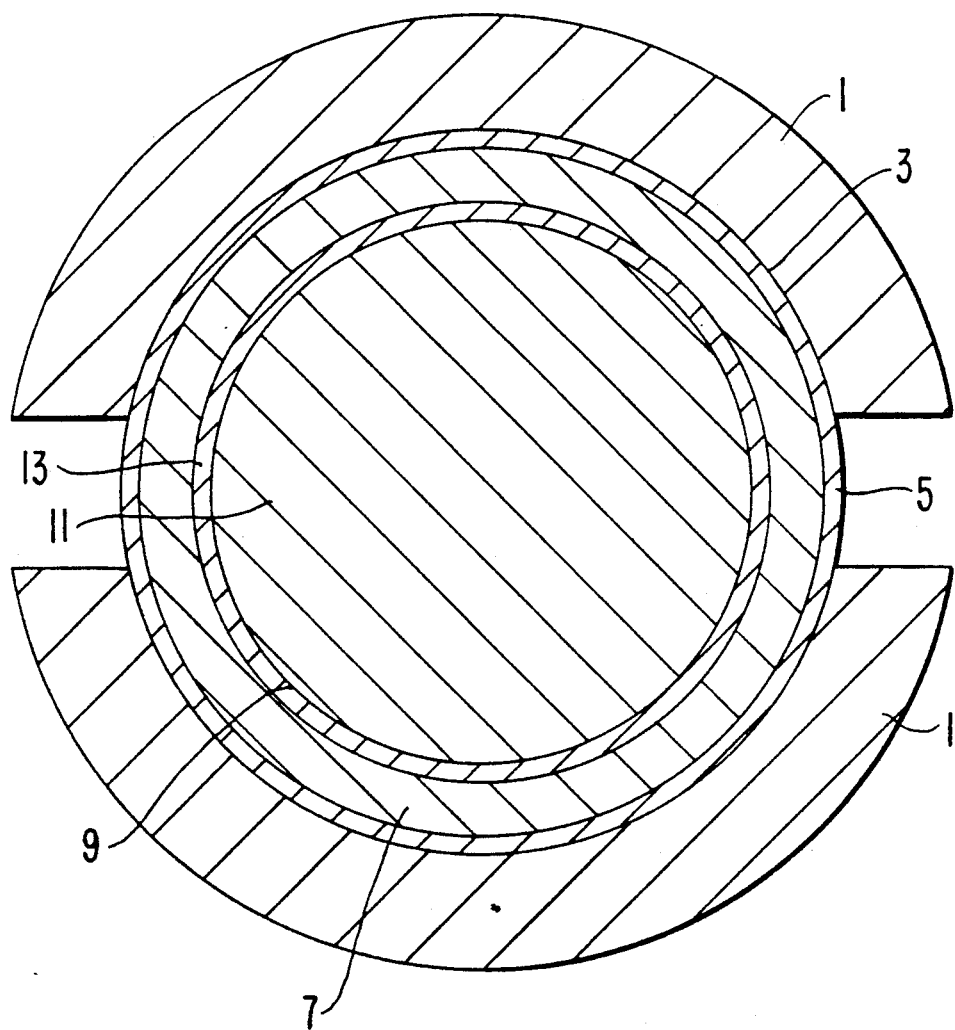

METHOD OF MOUNTING PERMANENT MAGNETS WITHOUT ORGANIC ADHESIVES

BACKGROUND OF THE INVENTION

The invention in this case relates to a new and improved magnet-to metallic body seal, to a magnetic device comprising such a seal and to an improved method of joining a permanent magnet to a metallic body.

It is known to bond permanent magnets to metallic bodies, including metal shafts, by epoxy adhesives. However, when the device utilizing such a magnetic device is a device such as an actuator is employed over a wide temperature range, for example at temperatures as low as $-40°$ C. and as high as $200°$ C., under conditions involving high speed rotation with many changes in direction and speed of rotation, it has been that there are frequent failures in the permanent magnet-metal shaft seal.

The Cole et al, U.S. Pat. No. 3,793,705 provides a more permanent method of bonding a permanent magnet to a metal body. The method of this patent involves joining a ferrite ceramic magnetic body such as a nickel-zinc type ferrite ceramic to a metallic body such as titanium or steel by sputtering a thin layer of a chromium containing metal on a surface of the magnetic body, providing a layer of a silver containing brazing alloy between the chromium containing metal layer provided on the surface of the body and the metal body and forming a brazed bond by heating the assembly at a temperature at the range of $600°$ C. to less than $1000°$ C.

The major problem with the use of the method of this patent is that many magnetic materials are decomposed at the brazing temperatures employed. Further the use of such a use of a high temperature also frequently causes demagnetization of the magnets joined by this method.

Bronnes et al, U.S. Pat. No. 4,643,347 describes a method of magnetic permanent magnets to metal bodies by which a reliable permanent magnet to metallic body seal is achieved and in which the use of high brazing temperatures are avoided. According to this method of mounting permanent magnets are bonded to a metallic body such as a rotating or reciprocating shaft by providing a layer of titanium on a surface of the magnet, providing a barrier layer such as a nickel layer, copper alloy or a layer of a nickel-iron-cobolt alloy on the layer of titanium and providing a solderable layer such as copper, nickel or gold on the barrier layer. The metal body is then soldered to the solderable layer with the use of a low melting solder such as tin-lead solder.

However, the method of this patent has some drawbacks. It requires the use of an intermediate or barrier layer thus increasing the cost of forming the seal. In addition it has been found that the use of the method is limited to those magnets that do not suffer decomposition at the soldering temperature and which do not demagnetize at the soldering temperature.

The method of this patent is thus very well limited to mounting magnets of the aluminum nickel cobalt or the rare earth cobalt compound type.

It has been found for example that this method of this patent is not useful for mounting permanent magnets of the rare earth ferrite type, for example of the Nd-B-Fe variety. Thus it has been found that, under the conditions of the method of this patent, considerable demagnetization and decomposition of the magnet occurs.

BRIEF SUMMARY OF THE INVENTION

A principal object of this invention is to provide an improved permanent magnet to metallic body seal and a magnetic device provided with such a seal.

According to one aspect of the invention a new improved permanent magnet to metallic body seal is provided. According to the invention, this seal consists essentially of a first thin metallic layer deposited on a surface of a magnet and consisting of a metal capable of forming a bond with the magnet, a second metallic layer consisting of a solderable metal provided on the surface of the first thin metallic layer and a layer of low-melting solder provided between, and contacting the layer of solderable metal and the metallic body.

The invention also relates a new and improved method of bonding a permanent magnet to a metallic body. According to this method a surface of a permanent magnet material is provided with a thin layer of metal which is capable of forming a bond with the magnetic material, a layer of a solderable metal is provided on the surface of the thin layer of the metal capable of forming a bond with a permanent magnet material and soldering of the metallic body to the layer of solderable metal between, is then carried out by providing a layer of low melting solder and contacting the opposing surface of the metallic body and the layer of solderable metal and heating the resultant assembly. The permanent magnet is then formed by magnetizing the permanent magnet material.

BRIEF DESCRIPTION OF THE DRAWING

The sole FIGURE in the drawing in this case is a cross-sectional view of a magnetic device, in particular a metal shaft, the surface of which is provided with permanent magnets in accordance with the invention.

DETAILED DESCRIPTION OF THE INVENTION

While the metal body to which the magnets are to be joined, may formed of any solderable metal it is preferable that this body be formed of iron, solderable alloys of iron, copper, and solderable alloys of copper.

Examples of metals which may be used to form the thin metallic layer on a surface of the magnet and which are capable of forming a bond with the magnet are tantalum, niobium, zirconium, hafnium, titanium and vanadium.

Examples of the solderable metal that may be provided on the surface of the first metallic layer which bonds with the magnet are nickel, copper, alloys of nickel and copper gold and silver.

For best results it has been found that the thickness of the first metallic layer, the layer forming a bond with the magnet, should be less than the thickness of the layer of the solderable metal. Thus, it has been found that the thickness of this first thin metallic layer is preferably from about 0.1 $\mu$m to about 0.5 $\mu$m. The thickness of the second metallic layer, the layer of the solderable metal should be at least about 1.5 $\mu$m, a thickness of about 1.5 $\mu$m–20 $\mu$m producing satisfactory results.

Examples of permanent magnets that may be employed are the rare earth metal ferrites and the alnico magnets.

Examples of magnetic materials that may be employed are rare earth. Particularly, ferrites of the Nd-B-

Fe type may be employed to form the baron ferrites magnetic devices of the invention. In addition to magnets of the alnico (AlNiCo) and rare earth metal ferrite types, the magnets may be formed of other materials such as a samarium-cobalt intermetallic compound as described in the above-mentioned U.S. Pat. No. 4,643,347.

While any low melting solder may be employed, it is preferable that the solder be employed that has a melting point of less than 300° C. For example, a low-melting tin-lead solder may be used.

In carrying out the method of the invention a thin layer of the metal which bonds with the magnetic material is applied to a surface of the magnetic material. The thicker layer of the solderable metal is then deposited on the thin layer of the metal of forming a bond with a magnetic material. Various methods of depositing these methods may be employed. Preferably, a sputtering technique such as diode sputtering is employed.

In order to avoid a small amount of demagnetization that may occur, even at the low soldering temperature employed, magnetization of the magnetic material is carried out subsequent to the formation of the magnet to metallic body seal.

The invention will now be described in greater detail with reference to the drawing.

Two arc-shaped concentric 1, segments are formed of a NdFeB type magnetic material.

The concave surfaces 3 of these arc shaped segments 1 are then cleaned. A thin layer of about 0.5 $\mu$m 5 of tantalum is then applied to the cleaned surfaces by a diode sputtering technique in a manner as disclosed in the above-mentioned U.S. Pat. No. 4,643,747, the contents of which are hereby incorporated by reference.

By a similar technique a 2 $\mu$m thick layer 7 of Ni is then applied to the surface of the tantalum layer 5. The concave surface of the layer 7 and the corresponding convex surface 9 of a concentric steel core 11 are provided with a thin layer of a low-melting lead tin solder 13. The two arc shaped segments 1 are then positioned on the surface cover of the steel core so as to leave two gaps between the segments. The resultant assembly thus provided with the solder layer 9 is then heated to a temperature of 225° C.

The magnetic material segments are then converted to permanent magnets by placing the assembly in an intense magnetic field such that a permanent magnet With typical properties of Br 11000 Gauss, He 10500 Oersteds, Hci, 20000 Oersteds and a BHmax of 30 MGO results.

The resultant rotor assembly may be usefully employed as the rotor of a linear digital actuator or similar device.

What is claimed is:

1. A magnet to metallic body seal consisting essentially of a first thin metal layer of a thickness of about 0.1 $\mu$m to about 0.5 $\mu$m and consisting of a metal selected from the group consisting of tantalum, niobium, zirconium, hafnium, titanium and vanadium and contacting a surface of a permanent magnet, said first thin metal layer being capable of forming a bond with said magnet, a second metallic layer consisting of a solderable metal selected from the group consisting of nickel, copper, alloys of nickel and copper, gold and silver and provided on the surface of said first thin metallic layer and a layer of a low melting point solder provided between, and contacting, said second metallic layer and said metallic body, at least the surface of said metallic body contacting said layer solder consisting essentially of a solderable metal selected from the group consisting of iron, solderable alloys of iron, copper, and solderable alloys of copper.

2. The magnet to metallic seal of claim 1 wherein the second metallic layer is at least about 1.5 $\mu$m thick.

3. The magnet to metallic body seal of claim 2 wherein the metallic body is a metal shaft.

4. The magnet to metallic seal of claim 3 wherein the metal shaft is a steel shaft.

5. A magnetic device comprising a metallic body a surface of which body is provided with at least one permanent magnet, said surface consisting essentially of a solderable metal selected from the group of consisting of iron, solderable alloys of iron, copper and solderable alloys of copper, said magnet having been soldered to said surface by a layer of solder provided on a layer of solderable metal contacting said layer of solder and a thin layer, of a thickness of about 0.1 $\mu$m to about 0.5 $\mu$m, of a metal provided on a surface of said magnet, capable of forming a bond with said magnet and contacting said layer of solderable metal and selected from the group consisting of tantalum, niobium, zirconium, hafnium, titanium and vanadium.

6. The magnetic device of claim 5, wherein the layer of the solderable metal contacting said layer of solder and said thin layer of a metal provided on the surface of the magnet is at least about 1.5 $\mu$m thick and consists of a member selected from the group consisting of nickel, copper, alloys of nickel and copper, gold and silver.

7. The magnetic device of claim 6 wherein the metallic body is a metal shaft.

8. The magnet device of claim 7 wherein the metal shaft is a steel shaft.

9. The magnetic device of claim 6 wherein the permanent magnet comprises a rare earth metal ferrite.

10. The magnetic device of claim 9 wherein the permanent magnet comprises a rare earth metal ferrite containing neodymium, iron, and boron.

* * * * *